United States Patent [19]

Plunkett, Jr.

[11] Patent Number: 4,500,753
[45] Date of Patent: Feb. 19, 1985

[54] TELEPHONE ANSWERING APPARATUS WITH RECORDED TIME OF DAY AND DATE

[75] Inventor: Luther C. Plunkett, Jr., Atlanta, Ga.

[73] Assignee: Lanier Business Products, Inc., Atlanta, Ga.

[21] Appl. No.: 411,529

[22] Filed: Aug. 25, 1982

[51] Int. Cl.³ .............................................. H04M 11/00
[52] U.S. Cl. ................................................... 179/6.03
[58] Field of Search .................... 179/6.03, 6.04, 6.09; 369/23

[56] References Cited

U.S. PATENT DOCUMENTS

| | | | |
|---|---|---|---|
| 2,580,447 | 1/1952 | Lutz | 179/6.04 |
| 3,372,240 | 3/1968 | Boyers | 369/19 |
| 3,728,486 | 4/1973 | Kraus | 179/6.17 |
| 3,808,372 | 4/1974 | Sielsch | 179/6.01 |
| 3,914,551 | 10/1975 | Hunt | 179/6.13 |
| 3,925,617 | 12/1975 | Sato | 179/6.13 |
| 4,230,909 | 10/1980 | Baum . | |
| 4,391,530 | 7/1983 | Wakabayshi | 369/23 |

FOREIGN PATENT DOCUMENTS 49978 5/1981 Japan ..................................... 369/23

OTHER PUBLICATIONS

"New Custom Calling Services", publication date unknown, by Bell Laboratories.

*Primary Examiner*—Alan Faber
*Attorney, Agent, or Firm*—Jones & Askew

[57] ABSTRACT

A telephone answering apparatus including an electronic clock and calendar for maintaining data representative of the time of day and date when an incoming message is received, a speech synthesizer for generating a synthesized vocal audio signal stating the time of day and date, and a recorder for recording the synthesized audio signals on a recording media contiguous to the incoming message. The preferred embodiment uses a programmed digital microcomputer which detects a ringing condition on the telephone line, conditions a recorder containing a prerecorded outgoing recorded message to play back the message to the calling party, conditions the speech synthesizer to generate the audio signals stating the time of day and date, and conditions the recorder to record on the recording media both the synthesized speech and an incoming message received over the telephone line so that the called party upon review of his messages may determine the time of day and date when a particular call was received.

10 Claims, 13 Drawing Figures

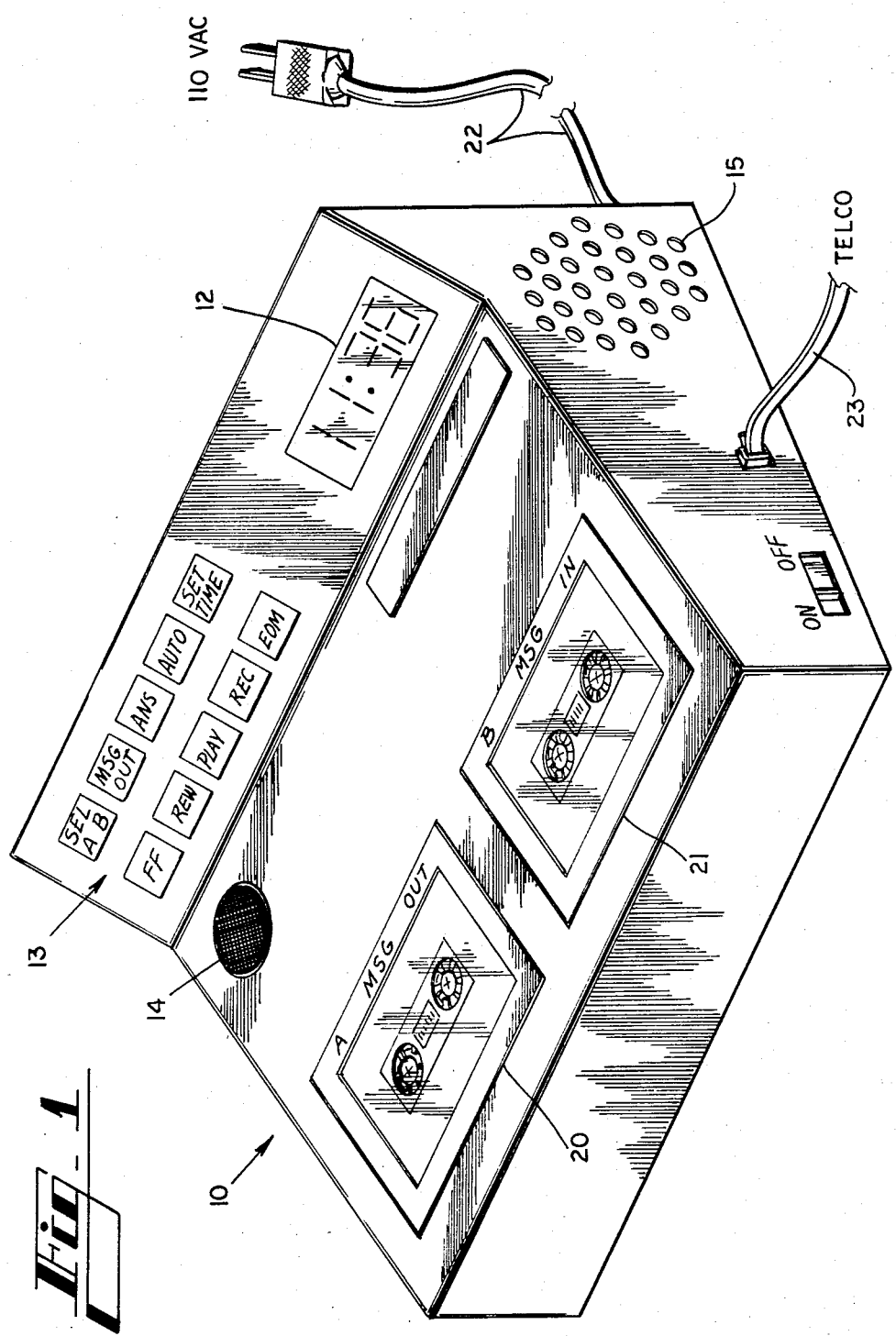

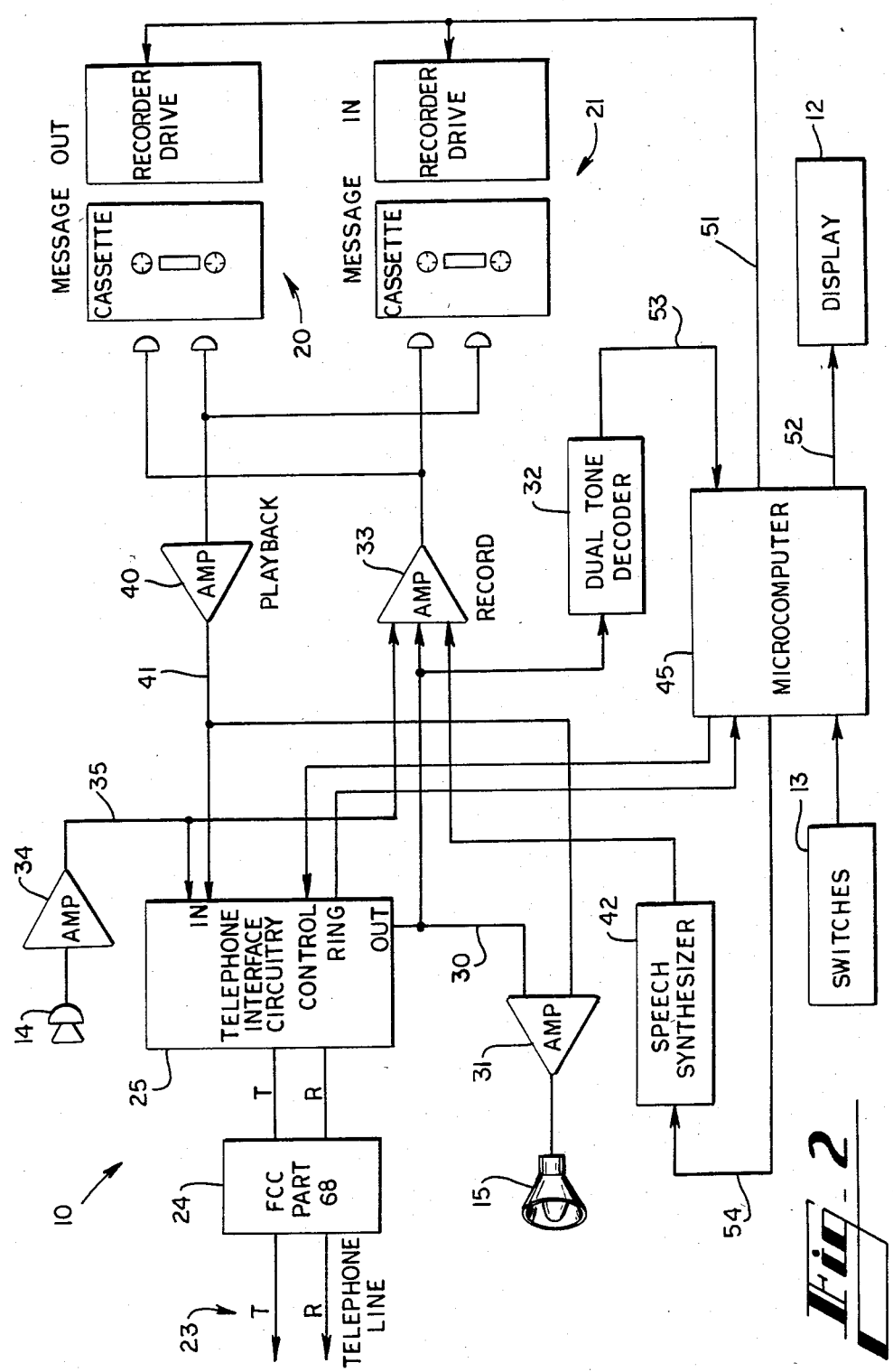

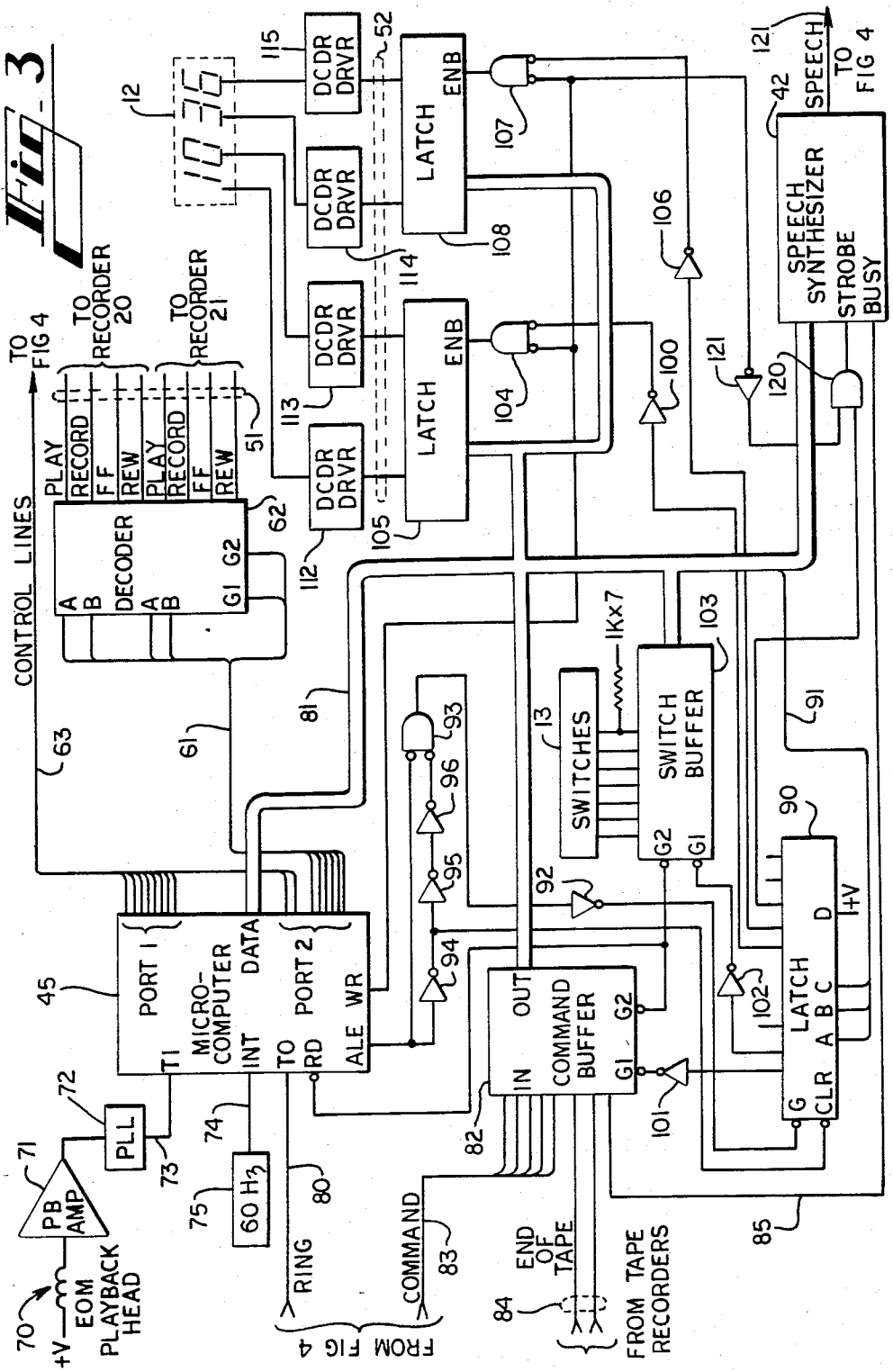

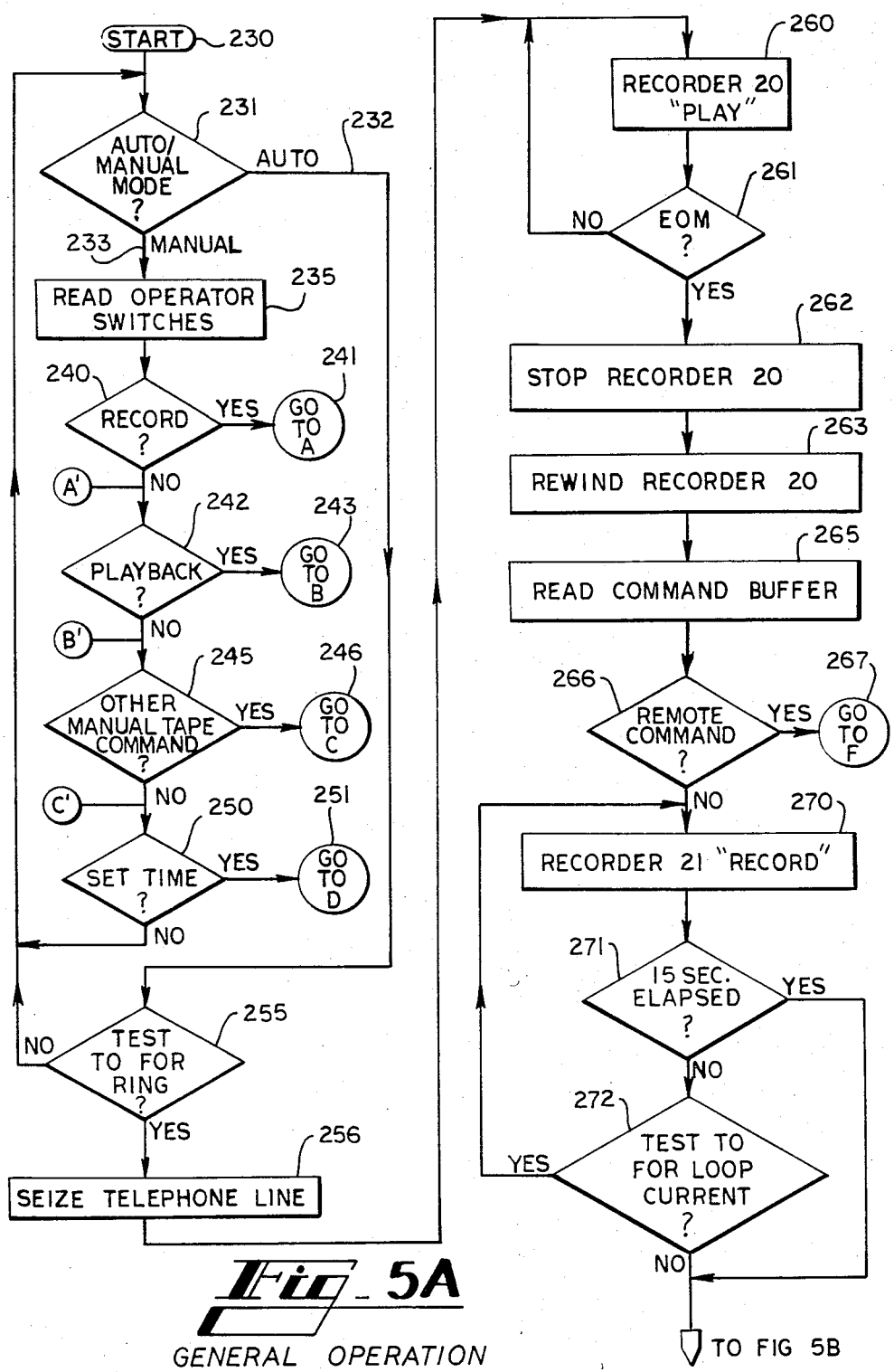
Fig_5A
GENERAL OPERATION

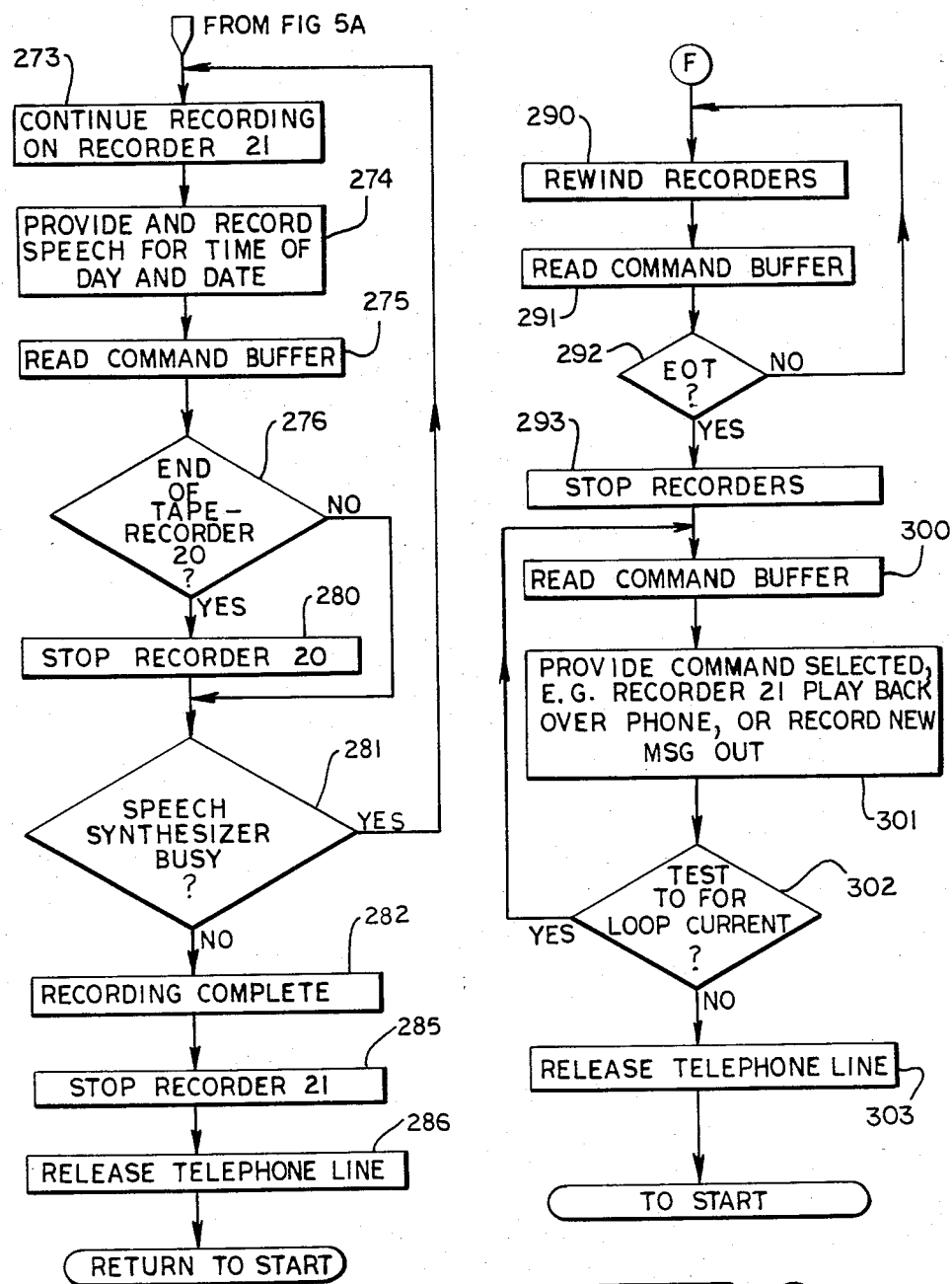

INTERRUPT SUBROUTINE

PLAY BACK SUBROUTINE

RECORD SUBROUTINE

OTHER MANUAL SUBROUTINE

TELEPHONE ANSWERING APPARATUS WITH RECORDED TIME OF DAY AND DATE

BACKGROUND

1. Field of the Invention

The present invention relates generally to telephone answering equipment and particularly to a telephone answering device which automatically answers an incoming call with a predetermined message, provides a recording apparatus for recording an incoming message, and provides a recorded time signal which allows a determination of the time and date than an incoming call was received.

2. Description of the Prior Art

Recent years have seen a proliferation of different types of telephone answering systems which will automatically answer an incoming call, provide a recorded message to the caller, and subsequently provide a recording function to allow the caller to record a message for the called party.

Recent years have also seen the development of improved telephone answering systems which allow the called party to remotely access his recorded messages. Often, the called party obtains access to the messages by dialing the telephone number of the answering equipment and providing control signals corresponding to recorder functions when the answering equipment seizes the line. Typical recorder functions which may be remotely controlled by the called party include review of recorded messages, recording of new predetermined outgoing messages, and erasing recorded incoming messages which have been reviewed.

A problem with conventional telephone answering equipment is that the called party typically has no way of determining the time of day when a particular message was received. At best, the called party is only able to determine that one call was received prior to a later call simply because of the order of review of the recorded messages.

The problem with reviewing recorded messages in the sequence in which they were received is that there may sometimes have been calls received which have already been responded to by the called party. For example, a particular calling party, because of the urgency of a message, will repeatedly call and leave recorded messages for the called party. The called party, after he begins review of his recorded messages, typically responds by returning the call to the calling party. Subsequently, the called party may return other calls and may undertake some work activity prior to reviewing other messages.

In the interim, there may or may not have been received other incoming messages. When the called party begins to review his recorded messages again, should he encounter another message from a party whose call he has already returned, he may undergo some confusion as to whether he has already responded to the particular calling party. This problem is especially acute if there is a prolonged period of time between review and response to recorded messages.

In conventional telephone answering equipment, the called party has no means for determining whether a given recorded message from a particular calling party, if received subsequent to a response given to a previous message from that same party, is a subsequently received message which requires a new response, or is instead another of perhaps several repeated messages left by that calling party. Since incoming messages are recorded sequentially, the called party might be reviewing a recorded message to which he has already responded. Or, he might instead be reviewing a new message from the same party to which a response should be given.

The Bell System provides a service in its Stored Program Controlled (SPC) network wherein a telephone customer may have call answering (CA) performed at the telephone office. In this service, just prior to returning a message to the customer, the CA service automatically tells the customer the time of day and day of week in which that message was recorded. This CA service, while it alleviates many of the problems related to insufficient information about messages, is based upon a large, centrally located computer system which stores messages in digital form on mass disk storage. There is need, however, for a compact, inexpensive and convenient call answering system which provides the same features but at reduced cost and inconvenience.

SUMMARY OF THE INVENTION

The present invention overcomes the aforementioned shortcomings of conventional telephone answering equipment by providing apparatus in which an audio time of day and date signal associated with a particular incoming call is recorded together with the incoming call so that upon review the called party will know the time at which the message was received. By observing the time of day at which he responds to a particular message from a particular calling party, and by noting the time of day at which a subsequently received call from that same party was received, the called party may eliminate the need to review particular recorded messages from that same party. Thus, the called party can more quickly and efficiently review his recorded messages and eliminate unnecessary return calls to persons whose calls have already been answered.

The present invention comprises an improvement over conventional automatic telephone answering equipment, and is vastly simpler than the Bell System CA service which requires expensive mass storage disk systems for recording of messages. The improvement comprises an electronic clock and calendar which maintains the time of day and date and which provides a time signal characteristic of the time and date that an incoming message is received, a speech generator responsive to the time signal which generates audio time signals representative of the time of day and date, and recording apparatus which records the audio time signals on a recording media contiguous or proximate to the incoming message signals. A separate recording apparatus provides an outgoing message or greeting in response to a call prior to recording the incoming message.

The improvement is thus usable with automatic telephone answering equipment which is responsive to a ring signal on the telephone line for generating an outgoing predetermined message for transmission over the telephone line to the calling party, and is further responsive to the end of the outgoing predetermined message for conditioning the recording apparatus to record the incoming message. A single set of record/playback electronics is employed for playing back the outgoing message, recording the incoming message and audio time signals, and playing back the incoming message and audio time signals when message review is desired. Advantageously, conventional audio tape recorders may be used instead of the expensive digital disk storage as in the Bell CA system.

The preferred embodiment of the present invention includes a ring detector for detecting the ringing condition on the telephone line, a pair of audio signal recorders for recording audio signals on a recording media and for playing back recorded audio signals, a speech synthesizer for generating audio signals in response to receipt of speech command signals, and a programmed digital microcomputer operative to monitor a clock signal and store a time signal corresponding to the time of day and date. The microcomputer is further operative to seize the telephone line in response to a ringing condition on the telephone line, condition one of the recorders to play back a prerecorded audio outgoing message in response to the call, detect the end of the prerecorded audio outgoing message, and condition the other recorder to record incoming audio messages after the termination of the outgoing message signal.

Furthermore, the microcomputer generates a speech command signal for the speech synthesizer which causes the synthesizer to generate an audio time signal corresponding to the current time of day and date as maintained by the microcomputer, and conditions the incoming message recorder to record the audio time signal contiguous to the incoming audio message signal.

In the preferred embodiment, the time signal is recorded after the incoming message so that the calling party does not have to listen to the time of day and date and does not have to wait to leave his message. In another embodiment, a separate recording apparatus is dedicated to recording the time signal simultaneously with the incoming message so that the calling party is not required to listen to the time of day prior to leaving his message. Another embodiment of the present invention records the audio time of day signal immediately prior to the incoming message so that upon review the time at which the message was received will be heard before the actual message.

Accordingly, it is an object of the present invention to provide an improved telephone answering apparatus.

It is another object of the present invention to provide a simplified telephone answering apparatus which automatically records the time of day a message is received.

It is another object of the present invention to provide a simplified telephone answering apparatus which records the time of day and date a message is received in an audible form so that the called party may, upon review of his recorded messages remotely or in person, determine when a particular call was received.

It is another object of the present invention to provide telephone answering apparatus which includes a clock and calendar for maintaining the time of day and date, a speech generator which generates audio time signals representative of the time of day and date that the incoming message was received, and recording means which records the audio time signal contiguous to the incoming message, so that the called party may determine the time of day and date when a call was received.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 1 is a pictorial perspective view of a preferred embodiment of the present invention.

FIG. 2 is a block schematic diagram of the preferred embodiment of the present invention.

FIG. 3 is a detailed schematic diagram of the preferred embodiment of the present invention.

FIGS. 5A–5B is a flow chart diagram of the general operation of the programmed microcomputer employed in the preferred embodiment.

FIG. 6 is a flow chart diagram of a subroutine for processing a remotely generated command.

DETAILED DESCRIPTION OF THE PREFERRED EMBODIMENT

Figure 4A:
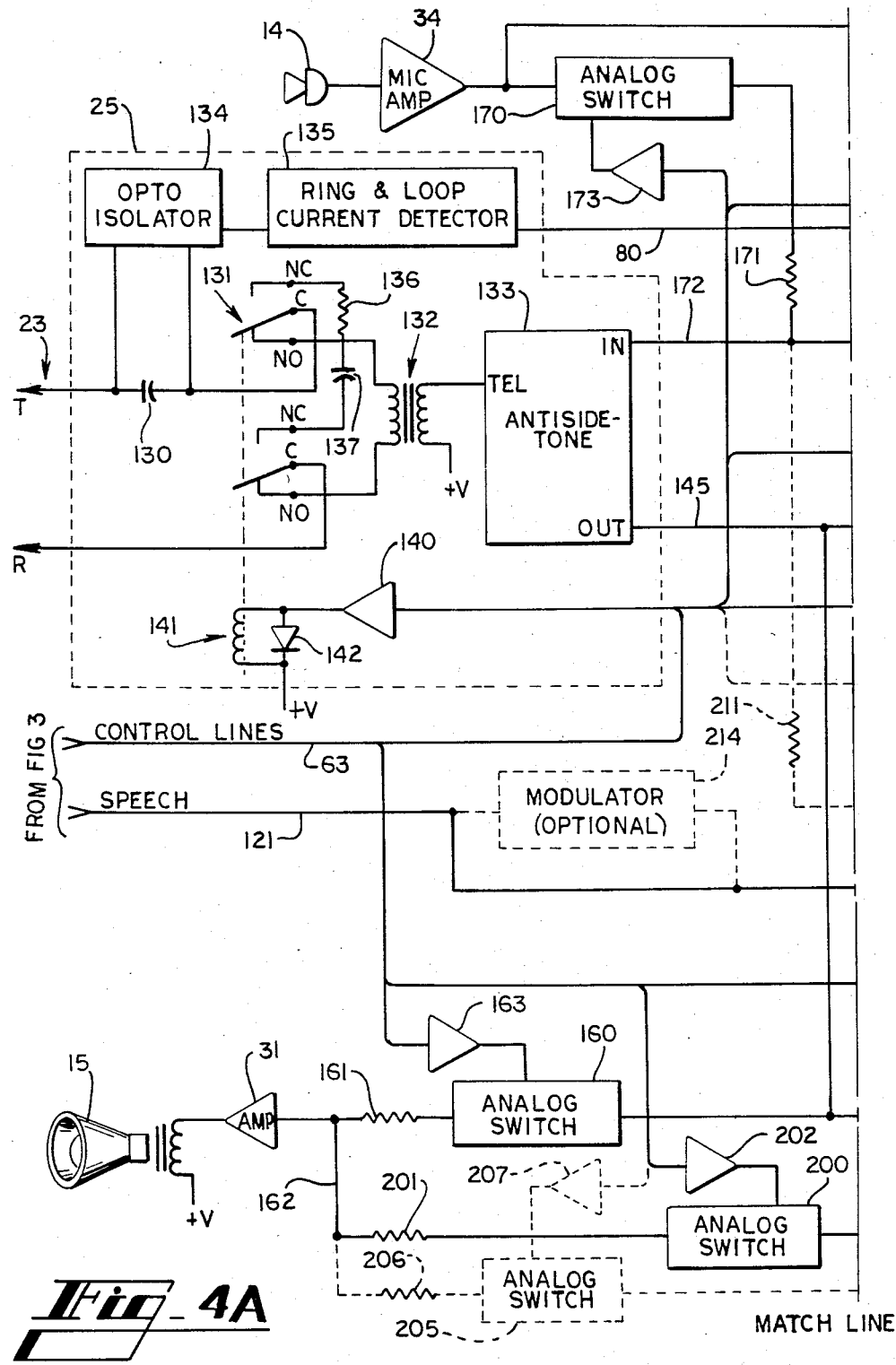
FIG. 4, which consists of FIGS. 4A and 4B, is a detailed schematic diagram of another portion of the preferred embodiment.

Referring now to the drawings, in which like numerals indicate like elements throughout the several views, FIG. 1 shows a preferred embodiment of a telephone answering machine 10 constructed according to the present invention. The machine includes a time display 12 for displaying the present time of day. Display 12 also displays the date when a "display date" mode is selected. A series of manual control switches 13 allow an operator to implement certain functions and modes such as fast forward, rewind, play, record, set time, display date, and the like.

A microphone 14 allows the operator to dictate a message for use as an outgoing message. A speaker 15 allows an operator in attendance to the machine to hear the playback of recorded messages.

The answering machine 10 shown in FIG. 1 includes a pair of tape recorders 20, 21, one of which is dedicated to holding a prerecorded outgoing message, and the other being dedicated to recording incoming messages. In the preferred embodiment, the recorder 21 records incoming messages and the time of day signal; separate tracks are provided for the incoming message and for the time of day signal.

A power cord 22 provides 110 volts AC electrical power to the apparatus in the conventional manner. It will be understood that a conventional power supply which provides power at appropriate voltage levels to the various circuitry included herein is attached to power cord 22, and no further description of power supply is included herein, it being within the skill of the art.

A telephone line 23 connects the answering machine 10 to the telephone system network.

Turning now to FIG. 2, a block schematic diagram showing the basic circuit components of the present invention may be seen. The telephone line 23, which includes a tip line T and a ring line R, is attached to protection circuitry 24 necessary to comply with Part 68 of the regulations of the Federal Communications Commission. Such circuitry is known to those skilled in the art.

The tip and ring lines from the output of FCC circuitry 24 are provided to telephone interface circuitry 25 which includes a ring detector (FIG. 4) disposed across the tip and ring lines and a telephone hybrid circuit (FIG. 4) which provides side tone suppression. The operation and implementation of these particular telephone functions will be discussed in greater detail in connection with FIG. 4.

The audio output OUT of the telephone interface circuitry 25 is provided on line 30 to an amplifier 31 which amplifies the signal received for reproduction on loudspeaker 15. The signal on line 30 is also provided to a dual tone decoder 32 which detects command signals received over the telephone line encoded in standard DTMF format. The signal on line 30 is also provided to a recording amplifier 33 which conditions the audio signal for recording on tape recorders 20 or 21.

The input IN of telephone interface circuitry 25 receives signals which are intended for transmission over the telephone line. One input is received from a preamplifier 34 which amplifies the signal from microphone 14. The output of amplifier 34 is provided on line 35 to telephone interface circuitry 25 and to an input of record amplifier 33 so that the operator can record outgoing messages when in attendance at the machine.

A playback amplifier 40 amplifies signals received from recorders 20, 21 when one or the other of the recorders is operative to play back recorded signals. The output of playback amplifier 40 is provided on line 41 to the input IN of telephone interface circuitry 25 so that recorded messages may be played back for transmission over the telephone line, and also to an input of loudspeaker amplifier 31 so that recorded messages may be played back through loudspeaker 15.

A speech synthesizer 42 generates synthesized audio speech time signals in response to a command. The nature and operation of speech synthesizer 42 will be described in greater detail below.

The central controller of the preferred embodiment of the present invention is a microcomputer 45 which switches signals to and from various of the circuits described under program control and maintains a time of day register and date register for use as the time of day clock and calendar. Control switches 13 are interfaced with microcomputer 45, so that the microcomputer is responsive to implement certain functions in response to actuation of the switches.

Microcomputer 45 controls tape recorders 20, 21 via recorder control lines 51, and provides signals on lines 52 which are converted into a display of the time of day by display 12. Microcomputer 45 also receives decoded command signals on line 53 from dual tone decoder 32. Speech command signals are provided on line 54 to speech synthesizer 42.

Turning now to FIG. 3, a detailed schematic diagram of the apparatus shown in block diagram form in FIG. 2 may be seen. In the preferred embodiment, microcomputer 45 is a type 8049 eight bit microcomputer manufactured by Intel Corporation of Santa Clara, Calif. It will be appreciated by those skilled in the art that other types of microcomputer circuits can be substituted for the microcomputer used in the preferred embodiment with equally satisfactory results. The type 8049 is particularly suitable for use in the present invention because it includes mask programmable read only memory for program storage, a 128×8 data memory, and an on-board timer/counter. Microcomputer 45 also includes a pair of output ports, PORT 1 and PORT 2, which are eight-bit quasi-bidirectional data ports.

One group of six of the PORT 2 lines is provided on lines 61 for controlling tape recorders 20 and 21. Lines 61 are provided to the A and B inputs and enable inputs G1 and G2 of a decoder 62. In the preferred embodiment, decoder 62 is a type 74LS139 independent 2-to-4 line decoder/demultiplexer currently manufactured by Texas Instruments, Inc. of Dallas, Tex. The outputs of decoder 62 are provided to tape recorders 20, 21 on lines 51. Four lines operatively associated with one of the independent decoders are provided to tape recorder 20, which is designated as the "message out" recorder. Similarly, four lines associated with the other independent decoder are provided to tape recorder 21, which is designated as the "message in" recorder. Each of the recorders 20, 21 is controlled by a signal on one of the four control lines, which include a line for the "play" function, the "record" function, the "fast forward" function, and the "rewind" function.

It will now be appreciated that microcomputer 45 controls the operations of tape recorders 20 and 21 by placing the appropriate signals on lines 61 of PORT 2. Recorders 20 and 21 are conventional tape recorders which include a playback head and a record head so that signals may be both recorded on the media and played back. On the embodiment shown, recorders 20, 21 are Philips-type cassette recorders.

The remaining two lines of PORT 2 and the eight lines of PORT 1 of microcomputer 45 are provided as control lines on lines 63 to the circuitry in FIG. 4. As will be discussed hereinbelow, microcomputer 45 generates control signals which control the switching of signals to and from various other circuit components.

Typically in telephone answering apparatus there is a tone appearing at the end of the outgoing message which signifies that the outgoing message has ended and that the calling party should then leave his message, which will be recorded. In the preferred embodiment of the present invention, a separate track of the "message out" recorder 20 is provided for recording this end-of-message (EOM) tone. In normal operation, the operator depresses one of the switches 13 which generates the EOM tone when he completes the dictation of the outgoing message.

An EOM playback head 70 is provided for detecting the EOM tone which is recorded on the separate track. A playback amplifier 71 amplifies the signal received from EOM playback head 70 and provides it to a conventional phase lock loop 72 which provides an output on line 73 when a tone having a frequency of the EOM tone is detected. Line 73 is connected to the T1 input of microcomputer 45, which is an input pin testable under program control. Microcomputer 45 periodically tests for the EOM tone by testing input pin T1 while recorder 20 is playing back the prerecorded outgoing message in response to a telephone call.

The interrupt input INT of microcomputer 45 is connected via line 74 to an AC voltage source 75 which provides a signal at the line frequency of 60 hertz. The interrupt input INT, as will be appreciated by those skilled in the art, initiates a program interrupt if the interrupt is enabled. Consequently, in the preferred embodiment, an interrupt is generated every 1/60 second so that an appropriate subroutine (FIG. 7) may update a time of day data register maintained within microcomputer 45. It will be appreciated that microcomputer 45 keeps track of the time of day by repetitively updating the time of day data register which is updated in increments of 1/60th of a second. At appropriate times, the calendar or date register is also updated. Conveniently, the type 8049 microcomputer used in the preferred embodiment can use the on-board timer/counter and RAM data memory to maintain the time of day and date registers. The time of day and date registers may be read under program control at any time and will always reflect the current time of day and date.

The T0 input of microcomputer 45 is connected on line 80 to a ring detector, shown in FIG. 4, which provides a signal RING in response to a ringing condition on the telephone line. Microcomputer 45 tests for the occurrence of a ringing condition by periodically testing the T0 input.

Microcomputer 45 includes a true bidirectional data port DATA which may be read or written synchronously using the read (RD) or write (WR) strobes, respectively. This bidirectional port is provided to an eight bit data bus 81 which is provided to several different peripheral devices, as discussed below.

One of these peripheral devices is a command buffer 82. In the preferred embodiment, command buffer 82 is implemented with a type 81LS95 tri-state octal buffer which switches its inputs IN to data bus 81 when enabled. Five of the inputs to command buffer 82 are received on lines 83 designated COMMAND which are connected to the dual tone decoder 32 shown in FIG. 4.

Two other inputs to command buffer 82 are received from tape recorders 20 and 21 on lines 84. Lines 84 provide signals designated "END OF TAPE" which indicate that the tape recorder has reached the end of the recording medium. Microcomputer 45 responds to an END OF TAPE signal by terminating a tape motion function which has been selected.

A final input to command buffer 82 is received on line 85 from the BUSY output of speech synthesizer 42, about which more will be said below.

Microcomputer 45 selects a particular peripheral device for reading or writing via eight bit addressable latch 90. In the preferred embodiment, latch 90 is a type 74259 eight-bit addressable latch currently manufactured by Texas Instruments, Inc. Three of the lower order bits of the data bus 81 are provided on lines 91 to the A, B and C select inputs of latch 90. The D input is provided to a logical high voltage level. The enable input (G) is provided from the output of an inverter 92, which has its input connected to the output of an inverted-AND gate 93. One input of gate 93 is connected to the address latch enable (ALE) output of microcomputer 45, while the other input to gate 93 is received through delay inverters 94, 95, and 96 from the ALE output of microcomputer 45. Inverters 92, 94, 95 and 96 are conventional 7404-type logical inverters manufactured by Texas Instruments. The output of inverter 94 is provided to the input of inverter 95 and to the clear (CLR) input of latch 90.

It will be understood that the negative-going edge of ALE strobes an address on bus 81 into external data or program memories. Consequently, the clear (CLR) input of latch 90 is normally held low thereby preventing any peripheral controlled by latch 90 from disturbing the voltage levels on data bus 81. When a low-going pulse appears on ALE, the clear will be removed from latch 90 and a pulse will appear on the output of gate 93. This pulse is inverted by inverter 92 and is received at the enable input G of latch 90, and causes one output of latch 90 to become active. Thus, latch 90 provides means for microcomputer 45 to select a particular peripheral device for reading or writing via data bus 81.

One output of latch 90 is provided to the input of inverter 101, whose output is provided to the G1 enable input of command buffer 82. The G2 enable input of command buffer 82 is connected to the read (RD) output of microcomputer 45. Thus, it will be appreciated that the signals received on the inputs of command buffer 82 may be strobed onto data bus 81 by selection through latch 90.

Another of the outputs of latch 90 is provided to the input of inverter 102, whose output is connected to the G1 enable input of a swtich buffer 103. In the preferred embodiment, switch buffer 103 is a type 81LS95 tri-state octal buffer. The other enable input G2 of switch buffer 103 is connected to the read (RD) output of microcomputer 45. The inputs of switch buffer 103 are connected to a plurality of control switches 13 which are conventional in nature. Depression of one of the control switches causes the voltage level appearing at the input of switch buffer to change. It will now be appreciated that the depression of one of the control switches 13 is detected by microcomputer 45 by reading the switch buffer 103 via data bus 81.

The control switches 13 are used in the preferred embodiment to provide manual control signals for the operation of various functions of the recorders. For example, the functions of selection between recorder 20 and 21 are the function of one switch, while other switches are used for commanding the fast forwarding, rewinding, playing or recording of the selected recorder. Another switch is dedicated to triggering a subroutine wherein the time of day and date registers are advanced for timesetting. Another switch is dedicated to selecting a manual telephone mode which conditions the apparatus to transmit signals received on the telephone line directly to the loudspeaker so that the apparatus may be used as a conventional telephone device. Another switch provides a signal that the EOM tone should be generated and recorded. Other desirable manual control functions, such as display date, may occur to those skilled in the art, and these functions may easily be implemented with conventional techniques such as simultaneous depression of two switches.

Another of the outputs of latch 90 is provided to the input of inverter 103, the output of which is provided to one input of inverted-AND gate 104. The other input to inverted-AND gate 104 is connected to the write (WR) output of microcomputer 45. The output of gate 104 is provided to the enable (ENB) input of an eight-bit latch 105.

In a similar fashion, another of the outputs of latch 90 is provided to the input of an inverter 106, the output of which is connected to the input of an inverted-AND gate 107. The other input of inverted-AND gate 107 is also connected to the write (WR) output of microcomputer 45. The output of gate 107 is provided to the enable (ENB) input of an eight-bit latch 108.

Latches 105, 108 in the preferred embodiment are type 74363 octal D-type transparent latches manufactured by Texas Instruments, Inc. While the enable input is high, the outputs will follow the data inputs. When the eanble is taken low the outputs will be latched at the level of the data that was set up at the inputs. The inputs of latches 105, 108 are connected to data bus 81. It will be appreciated that microcomputer 45 may therefore write data to latches 105, 108 by selecting either of the latches via latch 90 and performing a write instruction which causes a pulse to appear on the write (WR) output.

Latches 105, 108 are used in the preferred embodiment to store data representative of the current time of day. The outputs of latches 105, 108 are used to drive the digital display 12 which displays the current time of day. Four higher order bits of latch 105 are provided to the inputs of a decoder driver 112. The lower order four bits of latch 105 are provided to the inputs of a decoder driver 113. The higher order four bits of latch 108 are proviced to the inputs of a decoder driver 114, while the lower order four bits are provided to the input of decoder driver 115.

In the preferred embodiments, decoder drivers 112–115 are type 74143 four bit counter/latch 7-segment LED-lamp drivers manufactured by Texas Instruments. Each decoder driver 112–115 drives one digit of the four digits in display 12, a four-digit digital display. Those skilled in the art will appreciate that various commercially available 7-segment digital displays may be used in display 12.

Speech synthesizer 42 is also controlled by microcomputer 45. Data bus 81 provides command signals to the data input of speech synthesizer 42, in the preferred embodiment a type VSM2032 voice synthesis module manufactured by General Instrument Corporation of Hicksville, N.Y. The speech synthesizer generates synthesized speech by selected phrases upon receipt of appropriate command signals. The BUSY output of speech synthesizer 42 is provided on line 85 to an input of command buffer 82. The STROBE input of speech synthesizer 42 is connected to the output of an AND gate 120, one input of which is connected to an output of latch 90, and the other input of which is received through inverter 121 from the low-going write (WR) output of microcomputer 45. The output of speech synthesizer 42 appears on line 121 and is an analog audio signal designated SPEECH. It will now be appreciated that appropriate command signals for generating an audible signal indicative of the time of day are generated by microcomputer 45 by placing appropriate commands for speech synthesizer 42 on data bus 81.

It will now be appreciated that there has been described circuitry which provides means for storing and maintaining the time of day and date and for displaying same, for controlling the recording and playback functions of a pair of tape recorders, either by a control program sequence or in response to the actuation of manual control switches, and for generating an audio signal stating the time of day.

Figure 4B:
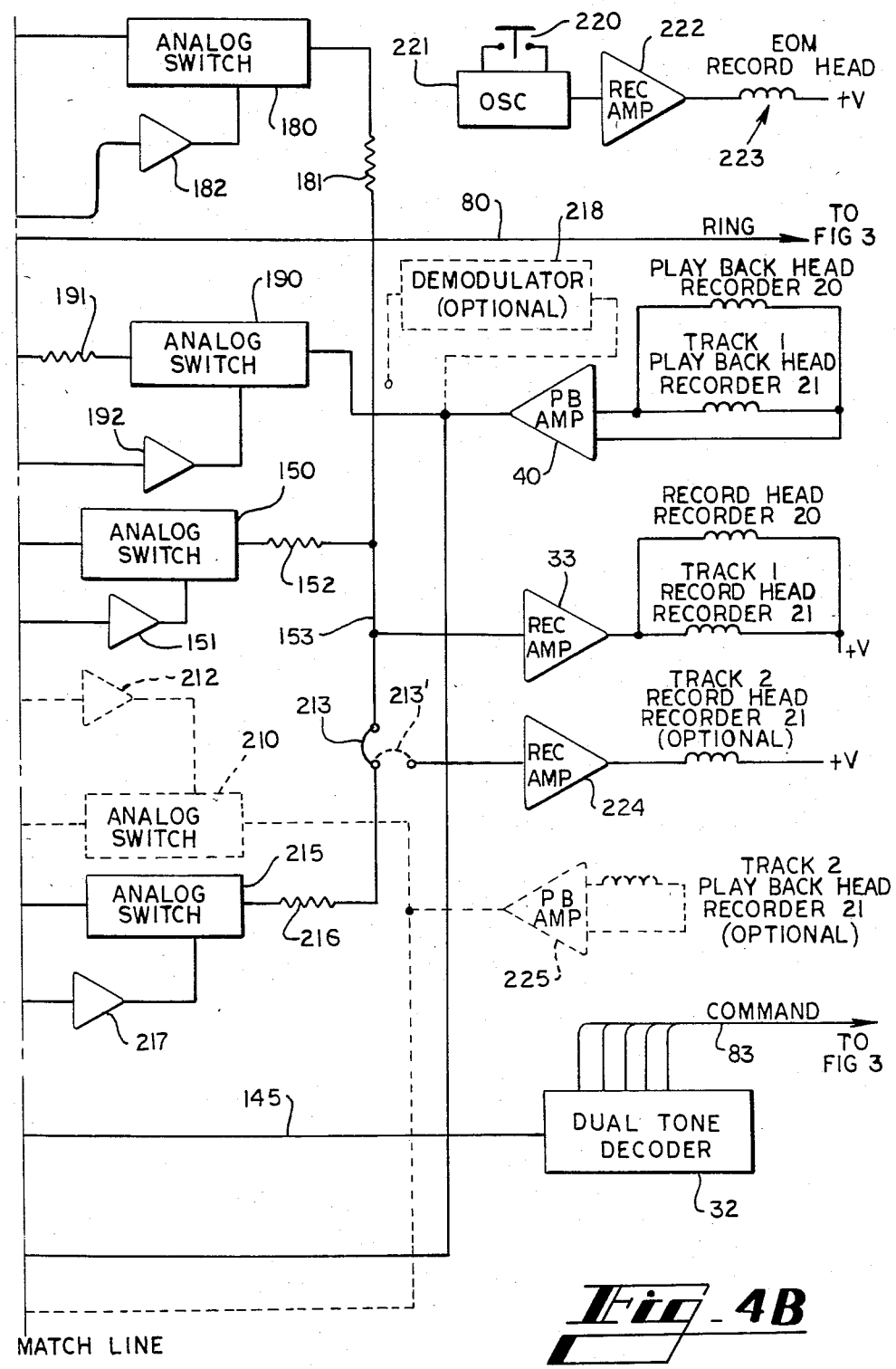

Turning to FIG. 4, which consists of FIGS. 4A and 4B, there will now be described circuitry for receiving and transmitting signals over the telephone line, providing audio signals to the record heads of tape recorders 20, 21, receiving playback signals from the recorders, and for switching desired audio signals from various signal sources to various destinations.

It will be recalled that in FIG. 2 the tip line T and ring line R from telephone line 23 after exiting FCC Part 68 circuitry 24 is brought to the telephone interface circuitry 25 shown in FIG. 4. The tip line T is brought through a filter capacitor 130 to the common C terminal of a conventional telephone relay 131. The ring line R is provided to the other common C terminal of the telephone relay 131. The normally-closed NC contacts of relay 131 provide a current path through resistor 136 and capacitor 137 between the tip line T and ring line R. The normally-open terminals NO of relay 131 are provided to the primary of transformer 132 which couples the AC component of a telephone signal to a telephone antisidetone circuit 133. Antisidetone circuit 133 is a conventional telephone hybrid circuit which suppresses at its output OUT the magnitude of the signal received on its input IN. The telephone line terminal TEL of antisidetone circuit 133 is connected to the secondary of transformer 132. It will be appreciated that a signal provided on the IN input is provided at the TEL terminal for transmission over the telephone line and is attenuated at the OUT output.

Disposed across the filter capacitor 130 on the tip line T is a conventional optoisolator 134. The output of optoisolator 134 is provided to a ring and loop current detector 135, which is a conventional telephone ring detector well known to those skilled in the art. The output of ring detector 135 is connected on line 80 and comprises the signal RING which is provided to the circuitry in FIG. 3. Those skilled in the art will appreciate that microcomputer 45 detects a ringing condition or the presence of loop current on the telephone line by testing the T0 input received on line 80 under program control.

When a ringing condition has been detected, microcomputer 45 seizes the telephone line by actuating relay 131. In the preferred embodiment, this is accomplished by a control signal placed on one of the control lines 63 which is provided to a conventional buffer driver 140. The output of driver 140 is provided to one terminal of relay coil 141. The other terminal of relay coil 141 is provided to a voltage supply; diode 142 suppresses transients across the terminals of coil 141 in the conventional manner.

It will now be appreciated that telephone interface circuitry 25 provides means whereby the telephone answering apparatus detects a ringing condition on the telephone line and responds thereto by seizing the telephone line so that signals may be transmitted and received over the telephone line.

Signals received over the telephone line are provided at the output terminal OUT of antisidetone circuit 133. These signals are provided to three different locations in the circuitry shown in FIG. 4. The telephone signals are first provided to the input of an analog switch 150, which in the preferred embodiment is a type CD4066 COS/MOS quad bilateral switch manufactured by RCA Corporation, Somerville, N.J. It should be noted that all analog switches used in the preferred embodiment are switches of this type. It will be appreciated that an analog signal appearing at the input of analog switches of this type will appear at the output of the switch when a signal is applied to the control input.

The control signal for analog switch 150 is received from the output of a conventional buffer driver 151, the input of which is connected to one of the control lines 63 from microcomputer 45. It will be appreciated that microcomputer 45 causes the appearance of the telephone signal at the output of analog switch 150 by placing a control signal on the appropriate control line. The output of analog switch 150 is provided through a resistor 152 to a summing junction 153 which is connected to the input of record amplifier 33. The output of record amplifier 33 is provided to the recording head of tape recorder 20 and to the recording head for one track of recorder 21. Advantageously, only a single record amplifier is required to drive the heads of both recorders 20 and 21.

The telephone signals from antisidetone circuit 133 are also provided to the input of analog switch 160. The output of analog switch 160 is provided through resistor 161 to a summing junction 162 at the input of loudspeaker amplifier 31. Analog switch 160 is controlled by a signal from microcomputer 45 which appears on one of the control lines 63 at the input of a conventional buffer driver 163, the output of which is connected to the control input of analog switch 160. It will now be understood that signals received over the telephone line may be switched to loudspeaker amplifier 31 which are reproduced by loudspeaker 15 so as to be audible.

The telephone signals from the OUT terminal of antisidetone circuit 133 are also provided to the input of a conventional dual tone decoder 32. The operation of dual tone decoders are known to those skilled in the art and will not be discussed further herein. The outputs of dual tone decoder 32 comprise the five lines 83 designated COMMAND which are provided to command buffer 82 in FIG. 3. Those skilled in the art will appreciate that microcomputer 45 detects sequences of dual tone pairs corresponding to remotely generated commands to perform various functions.

It will be recalled from previous discussion that an operator of the telephone answering machine may dictate predetermined messages for use as an outgoing message which is played back in response to receipt of a call. Still referring to FIG. 4, dictated messages are converted into electrical signals by microphone 14 and amplified by microphone amplifier 34. which is connected to the inputs of analog switches 170 and 180. The output of analog switch 170 is provided through a resistor 171 to a summing junction 172 at the input IN of telephone antisidetone circuit 133. Analog switch 170 is controlled by the output of a buffer driver 173 whose input is connected to one of the control lines 63 from microcomputer 45. It will now be appreciated that the operator's voice may be coupled onto the telephone line under control of microcomputer 45 so that the apparatus disclosed herein may be used conventionally as a telephone if desired.

The dictated message signals received from microphone amplifier 34 may also be made to appear at the output of analog switch 180, which is connected by a resistor 181 to summing junction 153 at the input of record amplifier 33. The control input of analog switch 180 is connected to the output of buffer driver 182, whose input is connected to one of the control lines 63 from microcomputer 45. It will thus be appreciated that dictated messages may be switched by microcomputer 45 to appear at the record head of recorders 20, 21. It will also be appreciated that outgoing messages may be recorded by the operator either in attendance at the telephone answering apparatus or remotely over the telephone line.

During playback from either of recorders 20, 21, signals are provided at the output of playback amplifier 40. Whether signals are played back from recorder 20 or 21 depends upon which recorder is placed in the playback mode by microcomputer 45. In the disclosed embodiment, it is contemplated that at any one time only one recorder will be in the playback mode since only one set of record/playback electronics are used. Signals appearing at the output of amplifier 40 are provided to the input of analog switch 190. The output of analog switch 190 is provided through resistor 191 to summing junction 172 at the input IN of antisidetone circuit 133. The control input of analog switch 190 is connected to the output of a buffer driver 192 whose input is connected to one of the control lines 63 from microcomputer 45.

Signals from playback amplifier 40 are also provided to the input of analog switch 200. The output of analog switch 200 is provided through resistor 201 to summing junction 162 at the input of loudspeaker amplifier 31. The control input of analog switch 200 is connected to the output of a buffer driver 202 whose input is connected to one of the control lines 63 from microcomputer 45. It will now be appreciated that signals generated during the playback of either prerecorded outgoing messages recorded on recorder 20 or incoming telephone messages recorded on recorder 21 may be coupled to the loudspeaker for review by an attendant operator or alternatively may be provided over the telephone line for remote review.

It will be recalled from the discussion above that audio signals corresponding to the time of day appear as the signal SPEECH on line 121 from speech synthesizer 42 in FIG. 3. In FIG. 4, these audio time of day synthesized speech signals are provided to the input of analog switch 215. The output of analog switch 215 is provided through resistor 216 to a jumper connecter 213. The control line of analog switch 215 is connected to the output of a buffer driver 217 whose input is connected to one of the control lines 63. In the preferred embodiment, jumper connecter 213 connects the SPEECH signal to the input of a record head amplifier 33, whose output is connected to the record heads for recorders 20, 21. The time of day and data signals are then recorded after the recording of the incoming message.

Alternatively, the jumper may be arranged as shown at 213' to connect the SPEECH signal to the input of record amplifier 224 for the second track of recorder 21. In this optional arrangement, the time of day and date may be recorded simultaneously with the incoming message. However, an embodiment thus constructed is less economical than the preferred embodiment because there is need for separate recording apparatus for the second track.

Another embodiment which allows simultaneous recording of the incoming message with the data and time and also dispenses with the need for separate recording apparatus includes a modulator 214, shown in dotted relief in FIG. 4, which may be connected to modulate the synthesized speech signals prior to recording. For example, modulator 214 may comprise an FM modulator connected between line 121 and analog switch 215. With such a construction, time of day signals may be recorded simultaneously with incoming message signals with a single recording apparatus. Optional demodulation means 218 would be required at the output of playback amplifier 40 so that the recorded time of day signals would be audible. The construction and connection of such modulaton/demodulation means will be understood by those skilled in the art.

In the event that apparatus for recording the SPEECH signals on the second track of recorder 21 is desired, a separate playback amplifier 225 is needed to amplify the signal from track two. Circuitry associated with this optional arrangement is shown in dotted relief in FIG. 4. The output of amplifier 225 would be provided to the input of analog switch 205. The output of analog switch 205 would be provided through resistor 206 to summing junction 162 at the input of loudspeaker amplifier 31. The control input of analog switch 205 would be connected to the output of a buffer driver 207 whose input is connected to one of the control lines 63.

The output of amplifier 225 would also be provided to the input of analog switch 210. The output of analog switch 210 would be provided through resistor 211 to summing junction 172 at the input IN of antisidetone circuit 133. The control line of analog switch 210 would be connected to the output of a buffer driver 212 whose input would be connected to one of the control lines 63.

It will now be understood that the recorded time of day and date signals may be coupled to either loudspeaker 15 or to the telephone line for either a construction involving separate track recording apparatus for the time of day signals or the preferred construction wherein the time of day and date signals are recorded on the same track with the incoming messages.

It will now be appreciated that the circuitry shown in FIGS. 3 and 4 comprises means for recording audio time and data signals on the recording media under control of microcomputer 45, means for recording predetermined outgoing message signals dictated by an operator either in attendance at the answering machine or remotely over the telephone line, means for detecting a ringing condition on the telephone line, means for seizing the telephone line in response to the ringing condition detected, means for detecting the end of the predetermined outgoing message signal, and means whereby the playback of the predetermined outgoing message signals may be halted at the end of the message and for causing a recorder to record incoming audio message signals.

Also shown in FIG. 4 is a circuit for generating a tone which at the end of message (EOM) signal corresponding to the end of the predetermined outgoing message. A pushbutton switch 220 is connected to a conventional audio frequency oscillator 221. The output of oscillator 221 is provided to a record amplifier 222, the output of which is provided to a separate record head 223 of recorder 20, the outgoing message recorder. In order for the operator to dictate a new outgoing message, he causes the apparatus to place recorder 20 in a recording mode, dictates his message, and depresses switch 220 at the end of his message. The tone generated will be recorded on a separate track for pickup by EOM playback head 70 shown in FIG. 3.

OPERATION OF THE PREFERRED EMBODIMENT

Turning now to FIGS. 5A–5B, the general operation of the circuitry comprising the preferred embodiment will now be described. FIG. 5 is a flow chart diagram which demonstrates a sequence of steps which may be embodied as a program for microcomputer 45. Those skilled in the art will now understand and appreciate that a telephone answering apparatus as described herein may be constructed by circuits comprising digital and analog hardware, or by a preferred embodiment, as disclosed herein, using a programmed microcomputer together with peripheral digital and analog hardware. It will be understood that the embodiment disclosed herein is merely illustrative and that the functional equivalents of microcomputer 45 may include other devices including digital hardware, firmware, or software, which are capable of performing the described functions and sequences in the telephone answering apparatus. It will be further appreciated that microcomputer 45 may be programmed to perform the steps outlined in FIG. 5.

Starting at START block 230, microcomputer 45 first inquires at 231 whether the mode of operation selected is automatic or manual. This may be accomplished by having one of the switches 13 designated "automatic" so that if microcomputer 45 detects that the switch is depressed, the "auto" branch 232 will be followed, or if not depressed the "manual" branch 233 will be followed. Assuming first that the manual mode is selected, microcomputer 45 will then read the operator switches at 235 to determine if a particular manual function is desired by the operator. For example, one of switches 13 in the preferred embodiment is designated "record", another "playback", another "set time", while still other switches are designated "fast forward" and "rewind". For purposes of illustration and not limitation, a few of the possible desired functions shall be described, it being understood that other functions typically associated with telephone answering machines may be provided.

If the "record" switch has been depressed at 240, the YES branch will be followed to block 241, which is designated "go to A". The subroutine to be executed by microcomputer 45 designated "A" will be described in connection with FIG. 8.

If the "playback" button is depressed at 242, the YES branch will be followed to block 243, which designates subroutine "B". This subroutine will be described in connection with FIG. 9.

If another manual tape command such as fast forward, rewind, or the like is selected at block 245, the YES branch will be followed to block 246. Block 246 indicates that subroutine "C" should be followed which is described in connection with FIG. 10.

If the switch designated "set time" is depressed at 250, the YES branch is followed to block 251, which indicates that subroutine "D" should be followed at 251. This subroutine will be described in connection with FIG. 11.

If none of the manual switches have been depressed, the sequence of operations should return to the decision block 231 wherein the auto/manual switch is read. When the "automatic" mode is selected, the program follows line 232 to decision block 255. Microcomputer 45 is then conditioned to be responsive to incoming telephone calls to provide the prerecorded outgoing message and to record incoming messages. At block 255, microcomputer 45 tests input T0 for the presence of the ring signal. When a ringing condition is detected, the telephone line is seized at 256 by actuating relay 131.

After seizure of the telephone line, the outgoing message recorder 20 is placed in the play mode at 260, and signals received from the playback head are coupled to the telephone line so as to be heard by the calling party. Microcomputer 45 at decision block 261 then tests input T1 for the presence of the EOM signal, which indicates that the end of the outgoing message has been detected. At such time as the EOM signal is detected, the outgoing message recorder 20 is stopped at 262, and this recorder is placed in a rewind mode at 263.

At 265, microcomputer 45 reads the command buffer 82 to determine whether a command has been received over the telephone line from a remote location. If a remote command has been detected at 266, the YES branch is followed to block 267, which is a subroutine for processing remote commands. This subroutine will be described in connection with FIG. 6. If no remote command is detected, microcomputer 45 reaches block 270 and places the incoming message recorder 21 in the recording mode. At block 271, the microcomputer inquires whether an arbitrary predetermined time period (fifteen seconds in the preferred embodiment) has expired, indicating that a predetermined period for recording a message has expired. If the fifteen second period has not elapsed, an inquiry is made at 272 to determine whether the calling party has hung up the telephone. Microcomputer 45 accomplishes this function by testing the T0 input for the presence of loop current. As will be appreciated by those skilled in the art, if the telephone receiver is hung up by a calling party, loop current in the telephone circuit will be interrupted by the central office, and this will be indicated on line 80 by ring detector 135.

If either the fifteen second message period has elapsed or the calling party has hung up the phone, microcomputer 45 reaches block 273; the incoming message recorder 21 is maintained in the recording mode for recording the time of day and date. At block 274, microcomputer 45 reads the time of day and date registers for the current time of day and date, and generates appropriate commands to cause speech synthesizer 42 to generate audio signals corresponding to the time of day and date which are coupled to the record head to be recorded on recorder 21.

It should be understood that the audio time of day signals are recorded contiguous relative to the incoming message. For example, and as shown in FIG. 5 for the preferred embodiment, the synthesized speech signals corresponding to the time of day and date are recorded on the same recorder as the incoming message signals. Preferably, the synthesized time of day and date speech signals are recorded immediately after the recording of the incoming message signals. Alternatively, the recording of the time of day may be slightly advanced so that upon review, the called party can hear the time of day before hearing the incoming message.

Continuing with the operation shown in FIG. 5, after the time of day and date signals are recorded at 274, microcomputer 45 again reads the command buffer 82 at 275 to determine whether the end of the tape of the recorder has been reached. If the end of the outgoing message recorder 20 has been reached at 276, which indicates that the rewinding of recorder 20 is complete, the recorder is halted at 280.

If the speech synthesizer 42 is busy, as indicated by reading command buffer 82 at 281, the program flow goes back to block 273, and the recorder 21 is maintained in the record mode. If the speech synthesizer is not busy, indicating at 282 that the time of day and date signals have been recorded (in applications where the time of day is recorded after to the incoming message), microcomputer 45 reaches block 285, wherein recorder 21 is stopped. The telephone line is then released at 286, and the program flow returns to the START block 230.

FIG. 6 is a flow diagram of subroutine "F" which is followed by microcomputer 45 if a remote command comprising a predetermined dual tone pair is provided by the operator from a remote location. The dual tone pair will be detected by dual tone decoder 32. Entering at block 290, when a remote command is detected, the first action typically taken is to rewind recorders 20 and 21 so that the first recorded incoming message may be reviewed. At 291, microcomputer 45 reads the command buffer to determine when the end of tape (EOT) has been reached. Rewinding continues by returning to 290 and repetitively reading the command buffer at 291 until the end of tape signal has been detected from recorders 20 and 21. When the end of tape signal is received at 293, recorders 20 and 21 are halted.

At block 300, the command buffer is read again, and digital signals corresponding to decoded dual tone pairs provided on the COMMAND lines 83 from dual tone decoder 32 are read from command buffer 82 and the appropriate function is implemented. Typical commands include the playback of recorded messages and the recording of a new outgoing message, as well as rewind for repetitive review of a given incoming message, fast forward to omit a redundant or unwanted incoming message, and the like.

After the selected commands are provided at 301, the program passes to decision block 302 wherein the input T0 is tested by microcomputer 45 to determine whether the operator has hung up. If loop current is detected, the flow returns to block 300 wherein the command buffer is read again. If the operator has hung up, microcomputer 45 releases the telephone line at 303 and control passes back to the START block on FIG. 5.

Figure 7:
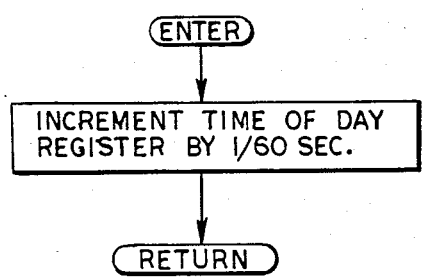
FIG. 7 is a flow chart diagram of a subroutine whereby the preferred embodiment maintains the time of day.

FIG. 7 illustrates a subroutine for servicing the interrupt which is received every 1/60th second by microcomputer 45. The time of day register is incremented by 1/60th second upon each interrupt. It will be appreciated that the time-keeping accuracy of the disclosed embodiment of present invention may be maintained to within 1/60th second, depending upon the stability of the power line frequency provided by voltage source 75 to the interrupt INT input of microcomputer 45.

Figure 8:
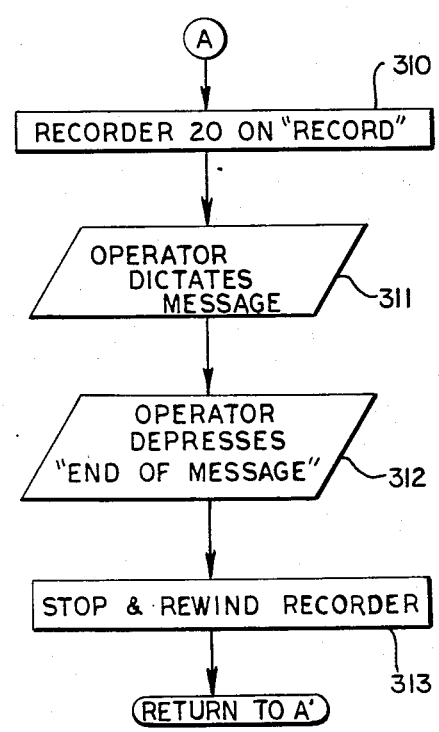
FIG. 8 is a flow chart diagram of a subroutine for recording a new outgoing message.

FIG. 8 is a flow diagram for record subroutine A, which is the subroutine to be followed when, for example, a new outgoing message is desired to be recorded. Entering at block 310, the first step to be followed by microcomputer 45 is to place the outgoing message recorder 20 in the record mode. Then, at 311, the operator dictates into microphone 14 the desired outgoing message, and microcomputer 45 switches the signals from microphone amplifier 34 to the record head of recorder 20. When the operator has completed his outgoing message, he depresses the end of message (EOM) switch 220 and a tone will be generated by oscillator 221 and recorded by EOM record head 223. Then, microcomputer 45 stops and rewinds recorder 21 at block 313, and the program flow returns to the point of entry at point A' on FIG. 5.

Figure 9:
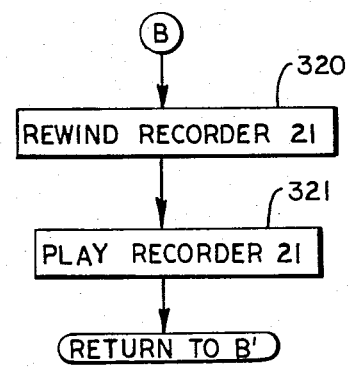
FIG. 9 is a flow chart diagram of a subroutine for manual playback of recorded messages.

FIG. 9 is a flow diagram for subroutine B, which is followed when it is desired to play back, for example when the operator desires to review his recorded messages. Entering at block 320, microcomputer 45 first places incoming message recorder 21 in a rewind mode until the end of tape signal is detected by reading command buffer 82. Then, at block 321, recorder 21 is placed in the play mode and recorded incoming messages are coupled by microcomputer 45 to the loudspeaker, or alternatively over the telephone line if a remote playback command has been selected. The program flow returns thereafter to point B' on FIG. 5.

Figure 10:
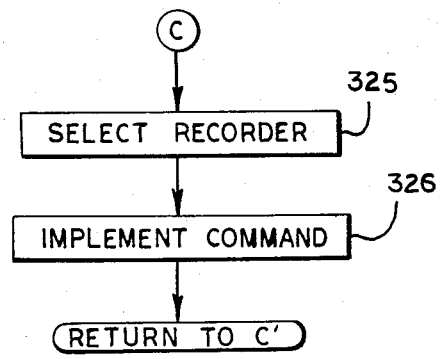
FIG. 10 is a flow chart diagram of a subroutine for processing a manual command.

In FIG. 10, subroutine C for implementing other manual commands such as fast forward, rewind, and the like is illustrated. At block 325, microcomputer 45 reads switches 13 to determine whether recorder 20 or 21 has been selected, and then at block 326 reads switches 13 to determine which particular command is selected. The commands are implemented and the program flow returns to point C' on FIG. 5.

Figure 11:
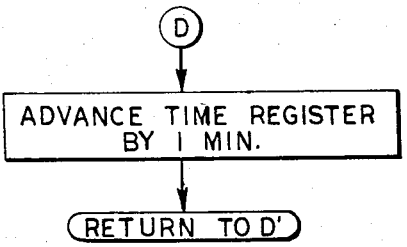
FIG. 11 is a flow diagram of a subroutine for setting the time of day.

FIG. 11 is a flow diagram for subroutine D, taken when the "set time" switch is depressed at decision block 250 in FIG. 5. In this subroutine, the time of day register is advanced by one minute repetitively so long as the switch designated "set time" is depressed. In this fashion, the time of day register may be rapidly advanced to correct the data stored by microcomputer 45 as the time of day and displayed on time display 12. It will be understood that the "set time" switch may be arranged so that the simultaneous depression of "set time" with other of switches 13 increments the time of day register or the date register at a fast rate or at a slow rate or in a forward direction or in a reverse direction, so that correction of the time of day and date may be conveniently corrected. After correction of the time of day, the program flow would return to point D' on FIG. 5.

The foregoing has been a description of the structure and operation of the preferred embodiment of the present invention of a telephone answering apparatus. It will be appreciated that other alternative functions and sequences of operation of the telephone answering machine may be performed by the structure described herein while still remaining within the scope of the present invention. It will be appreciated by those skilled in the art that the apparatus of the present invention may be arranged so that the functional operation of the system an be readily modified by simply changing a few circuit connections or by changing the programmed sequence of operation of the microcomputer. Thus, it will be appreciated that the foregoing description has been merely illustrative, and that the present invention is limited solely by the appended claims.

I claim:

1. In an apparatus for automatically recording on a recording media audio incoming message signals received over a telephone line including means responsive to a ring signal on the telephone line for generating an outgoing message signal for transmission over the telephone line to the caller and means responsive to detection of the end of said outgoing message signal for conditioning a recorder to record said incoming message signals, the improvement comprising:
   clock means for continuously maintaining the time of day by storing digital time signals representative of the time of day;
   call received means responsive to said ring signal for automatically retrieving said stored digital time signals upon receipt of a call and for providing output digital time signals associated with the time of day at which a call was received;
   speech generation means responsive to being provided said output digital time signals for generating audio speech time signals characteristic of said output digital time signals; and
   means for recording said audio time signals on said recording media contiguous to said incoming message signals to associate each message received with the time of day at which such message was received.

2. The improvement of claim 1, wherein said audio time signals are recorded on said recording media prior to said incoming message signals.

3. The improvement of claim 1, wherein said audio time signals are recorded on said recording media after said incoming message signals.

4. The improvement of claim 1, further comprising second recording means for recording signals on a second recording media, and wherein said audio time signals are recorded on said second recording media simultaneously with the recording of said incoming message signal on said recording media.

5. The improvement of claim 1, further comprising modulation means, and wherein said audio time signals are modulated by said modulation means and recorded on said recording media simultaneously with the recording of said incoming message signals.

6. Apparatus for automatically recording on a recording media incoming audio message signals received over a telephone line contiguous to an audio time signal associated with the time at which each incoming message is received, comprising:
   ring detector means for providing a ring signal in response to detection of a ringing condition on said telephone line;
   audio recording means for recording audio signals on a recording media and for playing back audio signals recorded on said media;
   speech synthesizer means for generating audio signals in response to receipt of a speech command signal; and
   programmed digital microcomputer means operative to continuously store a time of day signal corresponding to the current time of day, further operative to seize said telephone line in response to said ring signal,
   further operative to cause said recording means to play back prerecorded outgoing audio message signals in response to seizure of said telephone line,
   further operative to switch said prerecorded outgoing audio message signals to said telephone line,
   further operative to detect the end of said prerecorded outgoing audio message signals,
   further operative to cause said recording means to cease the playback of said prerecorded outgoing audio message signals in response to detection of the end of said prerecorded outgoing audio message signals and to thereafter condition said recording means to record said incoming audio message signals,
   further operative in response to said ring signal to retrieve said time of day signals to associate the current time of day with each incoming message,
   further operative to generate said speech command signal associated with said time of day signal to cause said speech synthesizer means to generate an audio time of day signal corresponding to said time of day signal, and
   further operative to cause said recording means to record said audio signals from said speech synthesizer means contiguous to said incoming audio message signals.

7. The apparatus of claim 6, wherein said audio time of day signal is recorded subsequently to said audio incoming message signals.

8. The apparatus of claim 6, wherein said audio incoming message signals are recorded subsequently to said audio time of day signal.

9. The apparatus of claim 6, wherein said recording means is a first recording means, and further comprising second audio recording means for recording audio signals on a second recording media and for playing back audio signals recorded on said second recording media, and wherein said audio time of day signal is recorded on said second recording media simultaneously with the recording of said audio incoming message signal on said first recording media.

10. The apparatus of claim 9, wherein said second audio recording means comprises modulation means and demodulation means.

* * * * *

REEXAMINATION CERTIFICATE (646th)
United States Patent [19]
Plunkett, Jr.

[11] B1 4,500,753
[45] Certificate Issued  Mar. 10, 1987

[54] TELEPHONE ANSWERING APPARATUS WITH RECORDED TIME OF DAY AND DATE

[75] Inventor: Luther C. Plunkett, Jr., Atlanta, Ga.

[73] Assignee: Lanier Business Products, Inc., Atlanta, Ga.

Reexamination Request:
No. 90/000,875, Oct. 4, 1985

Reexamination Certificate for:
Patent No.: 4,500,753
Issued: Feb. 19, 1985
Appl. No.: 411,529
Filed: Aug. 25, 1982

[51] Int. Cl.[4] .......................................... H04M 11/00
[52] U.S. Cl. .................................. 179/6.03; 179/6.01
[58] Field of Search ................... 179/6.03, 6.04, 6.09; 369/23; 381/51

[56] References Cited

U.S. PATENT DOCUMENTS

| | | | |
|---|---|---|---|
| 2,580,447 | 1/1952 | Lutz | 179/6.04 |
| 3,372,240 | 3/1968 | Boyers | 369/19 |
| 3,728,486 | 4/1973 | Kraus | 179/6.17 |
| 3,808,372 | 4/1974 | Sielsch | 179/6.01 |
| 3,914,551 | 10/1975 | Hunt | 179/6.13 |
| 3,925,617 | 12/1975 | Sato | 179/6.13 |
| 3,998,045 | 12/1976 | Lester | 381/51 |
| 4,230,909 | 10/1980 | Baum | 360/12 X |
| 4,391,530 | 7/1983 | Wakabayshi | 369/23 |

FOREIGN PATENT DOCUMENTS

| | | |
|---|---|---|
| 972884 | 8/1975 | Canada . |
| 978884 | 8/1975 | Canada . |
| 52-11841 | 7/1973 | Japan . |
| 52-11843 | 7/1973 | Japan . |
| 49978 | 5/1981 | Japan .................................. 368/23 |

OTHER PUBLICATIONS

"New Custom Calling Services", publication date unknown, Bell Labs. Semiconductor.
National Semiconductor–Jun. 1981–DT 1051 Digitalker TM Speech Evaluation Kit.

*Primary Examiner*—Aristotelis M. Psitos

[57] ABSTRACT

A telephone answering apparatus including an electronic clock and calendar for maintaining data representative of the time of day and date when an incoming message is received, a speech synthesizer for generating a synthesized vocal audio signal stating the time of day and date, and a recorder for recording the synthesized audio signals on a recording media contiguous to the incoming message. The preferred embodiment uses a programmed digital microcomputer which detects a ringing condition on the telephone line, conditions a recorder containing a prerecorded outgoing recorded message to play back the message to the calling party, conditions the speech synthesizer to generate the audio signals stating the time of day and date, and conditions the recorder to record on the recording media both the synthesized speech and an incoming message received over the telephone line so that the called party upon review of his messages may determine the time of day and date when a particular call was received.

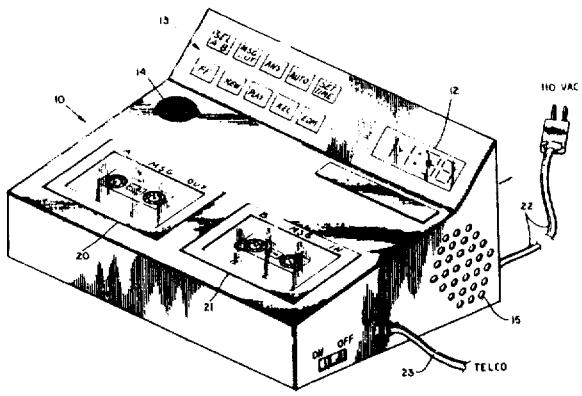

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-10 are cancelled.

* * * * *